US009982708B2

(12) United States Patent
Kamiya

(10) Patent No.: US 9,982,708 B2
(45) Date of Patent: May 29, 2018

(54) CRANKSHAFT

(71) Applicant: HONDA MOTOR CO., LTD., Tokyo (JP)

(72) Inventor: Mitsuyoshi Kamiya, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 273 days.

(21) Appl. No.: 14/663,395

(22) Filed: Mar. 19, 2015

(65) Prior Publication Data

US 2015/0275960 A1    Oct. 1, 2015

(30) Foreign Application Priority Data

Mar. 31, 2014   (JP) ................................. 2014-073770

(51) Int. Cl.
*F16C 3/08* (2006.01)
*F16C 3/14* (2006.01)

(52) U.S. Cl.
CPC ................. *F16C 3/08* (2013.01); *F16C 3/14* (2013.01); *F16C 2360/22* (2013.01); *Y10T 74/2174* (2015.01)

(58) Field of Classification Search
CPC ................ F16C 3/08; F16C 3/12; F01M 1/06
See application file for complete search history.

(56) References Cited

U.S. PATENT DOCUMENTS

| 2,109,526 | A | * | 3/1938 | Fell ........................... F16C 3/12 |
| | | | | 74/597 |
| 2,440,812 | A | * | 5/1948 | Simpson ................. F16N 39/06 |
| | | | | 184/6.24 |
| 3,704,636 | A | * | 12/1972 | Piech ........................ F16C 3/10 |
| | | | | 219/121.13 |
| 4,015,485 | A | * | 4/1977 | Ganter-Ullmann ....... F16C 3/08 |
| | | | | 74/596 |
| 4,622,864 | A | * | 11/1986 | Fetouh ...................... F01B 1/12 |
| | | | | 123/197.4 |

(Continued)

FOREIGN PATENT DOCUMENTS

| EP | 2927519 | A1 | * | 10/2015 | ................ F16C 3/08 |
| GB | 144231 | | * | 10/1920 | |

(Continued)

OTHER PUBLICATIONS

Define crankshaft—Google Search, google.com., May 13, 2017.*

(Continued)

*Primary Examiner* — Vinh Luong
(74) *Attorney, Agent, or Firm* — Mori & Ward, LLP

(57) ABSTRACT

A crankshaft of an internal combustion engine includes a crank journal, a crank pin, and a crank web. The crank journal is to be supported by a crankcase and to be rotatable around a crankshaft axis. The crank pin has a crank pin axis substantially parallel to the crankshaft axis to support a connecting rod which is rotatable around the crank pin axis. The crank web is provided between the crank journal and the crank pin to connect the crank journal and the crank pin. The crank web has a hole which extends from one side face of the crank web and passes in a vicinity of a connection section between the crank pin and the crank web when viewed in an axial direction along the crankshaft axis.

25 Claims, 7 Drawing Sheets

(56) References Cited

U.S. PATENT DOCUMENTS

| | | | | |
|---|---|---|---|---|
| 5,163,341 A | * | 11/1992 | Murrish | F16C 3/14 123/196 R |
| 6,202,620 B1 | * | 3/2001 | Yamaguchi | F01M 1/06 123/196 R |
| 6,626,138 B2 | * | 9/2003 | Sayama | B60K 6/24 123/149 R |
| 9,261,131 B2 | * | 2/2016 | Harada | F16C 3/06 |
| 2004/0187637 A1 | * | 9/2004 | Gokan | F16F 15/26 74/596 |
| 2007/0079789 A1 | * | 4/2007 | Oki | F01M 1/02 123/196 R |
| 2010/0224164 A1 | * | 9/2010 | Rabhi | F01M 1/06 123/197.4 |
| 2012/0118091 A1 | * | 5/2012 | Yamazaki | F16H 3/089 74/352 |
| 2013/0152731 A1 | * | 6/2013 | Murrish | F16C 3/08 74/595 |
| 2015/0060003 A1 | * | 3/2015 | Murrish | B22C 9/103 164/129 |
| 2015/0184690 A1 | * | 7/2015 | Kamiya | F16C 3/08 74/596 |
| 2016/0084294 A1 | * | 3/2016 | Tkac | B22C 9/10 74/596 |

FOREIGN PATENT DOCUMENTS

| | | | | |
|---|---|---|---|---|
| GB | 692517 | * | 6/1953 | F16C 3/08 |
| JP | 57206715 | | * 12/1982 | F16C 3/08 |
| JP | 357206715 A | | * 12/1982 | |
| JP | 10-078025 | | 3/1998 | |
| JP | 2011017399 A | | * 1/2011 | |

OTHER PUBLICATIONS

Define transverse—Google Search, google.com., Oct. 15, 2017.*
Define side face in geometry—Google Search, google.com., Oct. 16, 2017.*
Define side face, Google Search, google.com., Oct. 16, 2017.*
English Abstract of JP57-206715, Terashita et al., Dec. 18, 1982.*

* cited by examiner

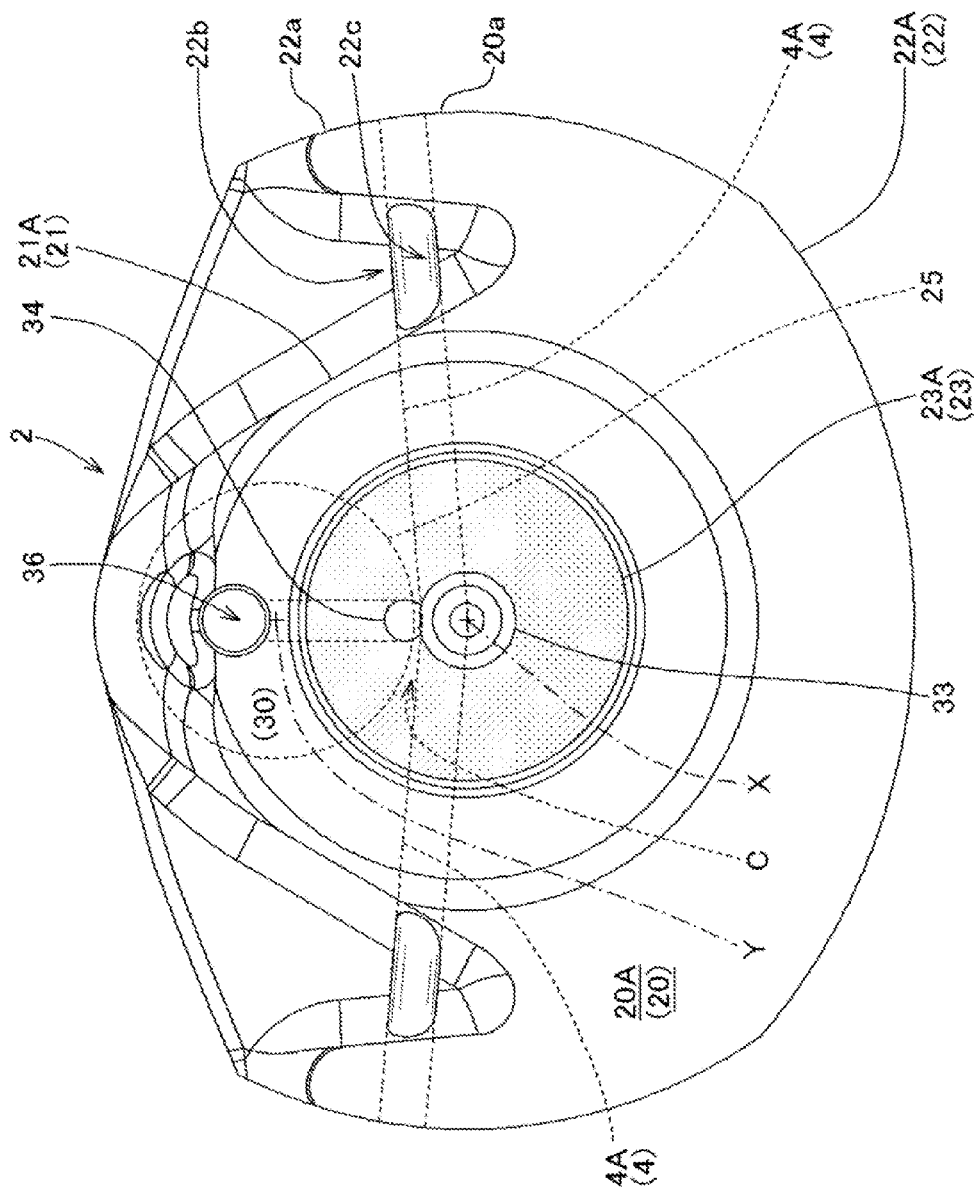

CRANKSHAFT

CROSS-REFERENCE TO RELATED APPLICATIONS

The present application claims priority under 35 U. S. C. § 119 to Japanese Patent Application No. 2014-073770, filed Mar. 31, 2014, entitled "Crankshaft." The contents of this application are incorporated herein by reference in their entirety.

BACKGROUND OF THE INVENTION

Field of the Invention

The present invention relates to a crankshaft.

Discussion of the Background

For example, Japanese Patent Laid-Open No. Hei 10-78025 given below shows a structure in which, a crankshaft of an internal combustion engine has lightening grooves near connection sections between crank journals and crank webs to distribute stress on the connection sections.

SUMMARY OF THE INVENTION

According to one aspect of the present invention, a crankshaft of an internal combustion engine includes crank journals, crank pins, and crank webs. The crank journals are pivotally supported by a crankcase. The crank pins are adapted to pivotally support connecting rods. The crank webs are adapted to connect the crank journals and the crank pin. The holes are provided in the crank webs, and the holes run from the side faces of the crank webs in axial view of the crankshaft and pass near connection sections between the crank pin and the crank webs.

According to another aspect of the present invention, a crankshaft of an internal combustion engine includes a crank journal, a crank pin, and a crank web. The crank journal is to be supported by a crankcase and to be rotatable around a crankshaft axis. The crank pin has a crank pin axis substantially parallel to the crankshaft axis to support a connecting rod which is rotatable around the crank pin axis. The crank web is provided between the crank journal and the crank pin to connect the crank journal and the crank pin. The crank web has a hole which extends from one side face of the crank web and passes in a vicinity of a connection section between the crank pin and the crank web when viewed in an axial direction along the crankshaft axis.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 7 is a cross-sectional view of the crankshaft in a modification example of the present embodiment in the width direction taken along arrow VII-VII in FIG. 3.

DESCRIPTION OF THE EMBODIMENTS

Figure 1:
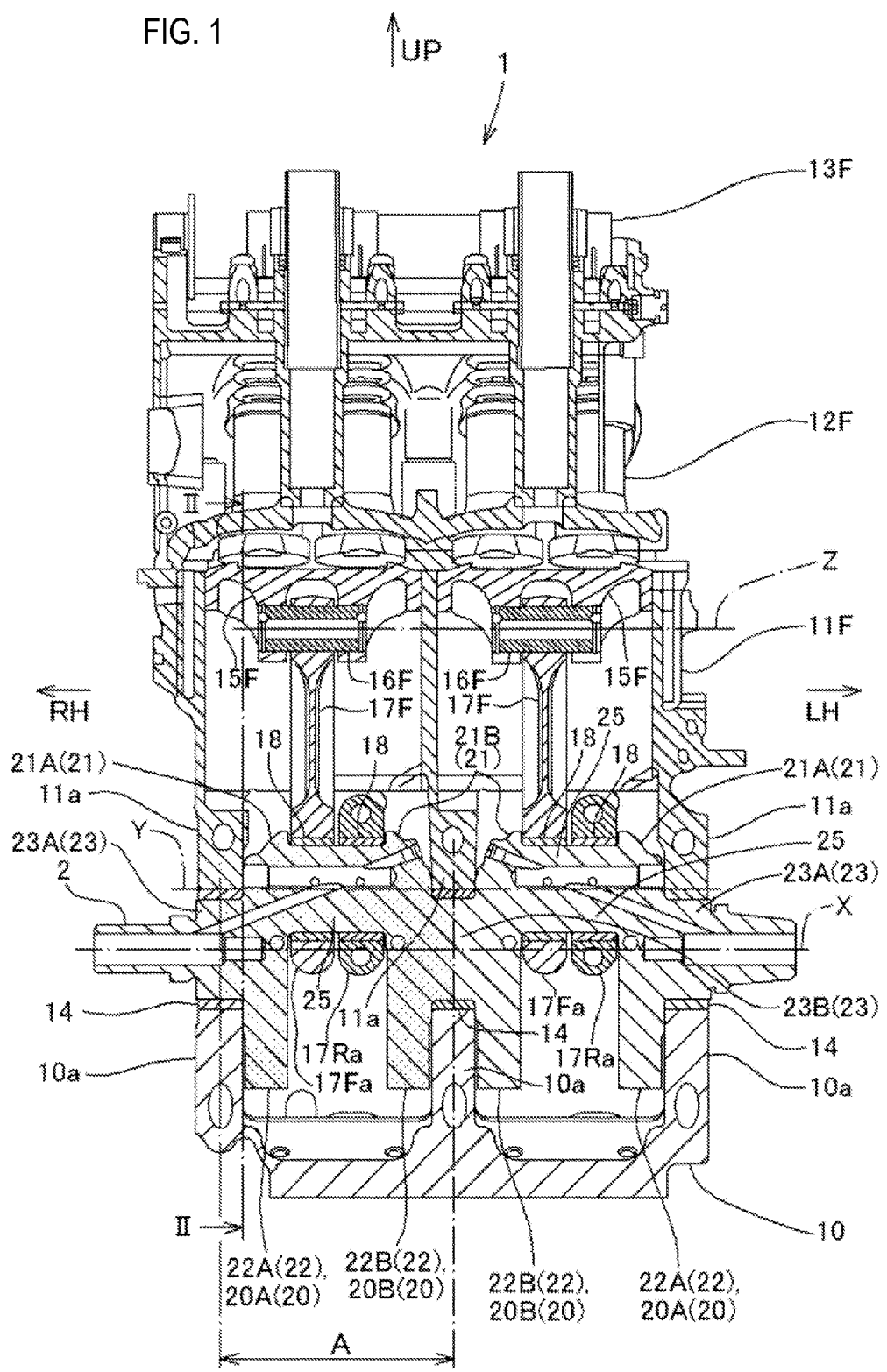
FIG. 1 is a partial front cross-sectional view of an internal combustion engine having a crankshaft according to an embodiment of the present invention.

The embodiments will now be described with reference to the accompanying drawings, wherein like reference numerals designate corresponding or identical elements throughout the various drawings.

A description will be given below of a crankshaft according to an embodiment of the present invention based on FIGS. 1 to 7.

An internal combustion engine 1 according to the present embodiment is a V-type four-cylinder four-stroke internal combustion engine. FIG. 1 is a partial front cross-sectional view of the internal combustion engine 1.

The internal combustion engine 1 is installed in a motorcycle in a landscape position with a crankshaft 2 oriented horizontally.

It should be noted that, unless otherwise stated, the longitudinal and horizontal directions in the description of the scope of claims and the present specification are according to the normal criteria of vehicles which states that the direction straight ahead of the motorcycle incorporating the internal combustion engine 1 is the forward direction. In the drawings, arrow FR represents the forward direction of the vehicle, arrow UP the upward direction thereof, arrow LH the leftward direction thereof, and arrow RH the rightward direction thereof.

It should be noted, however, that, in the description of the partial arrangement and the shape of the crankshaft 2 itself, the direction of an axial line X of the crankshaft (axial line of the crank journals) will be described as the vertical direction, and the direction orthogonal to the direction of the axial line X of the crankshaft 2 will be described as the width direction, the lateral direction, and so on.

Figure 2:
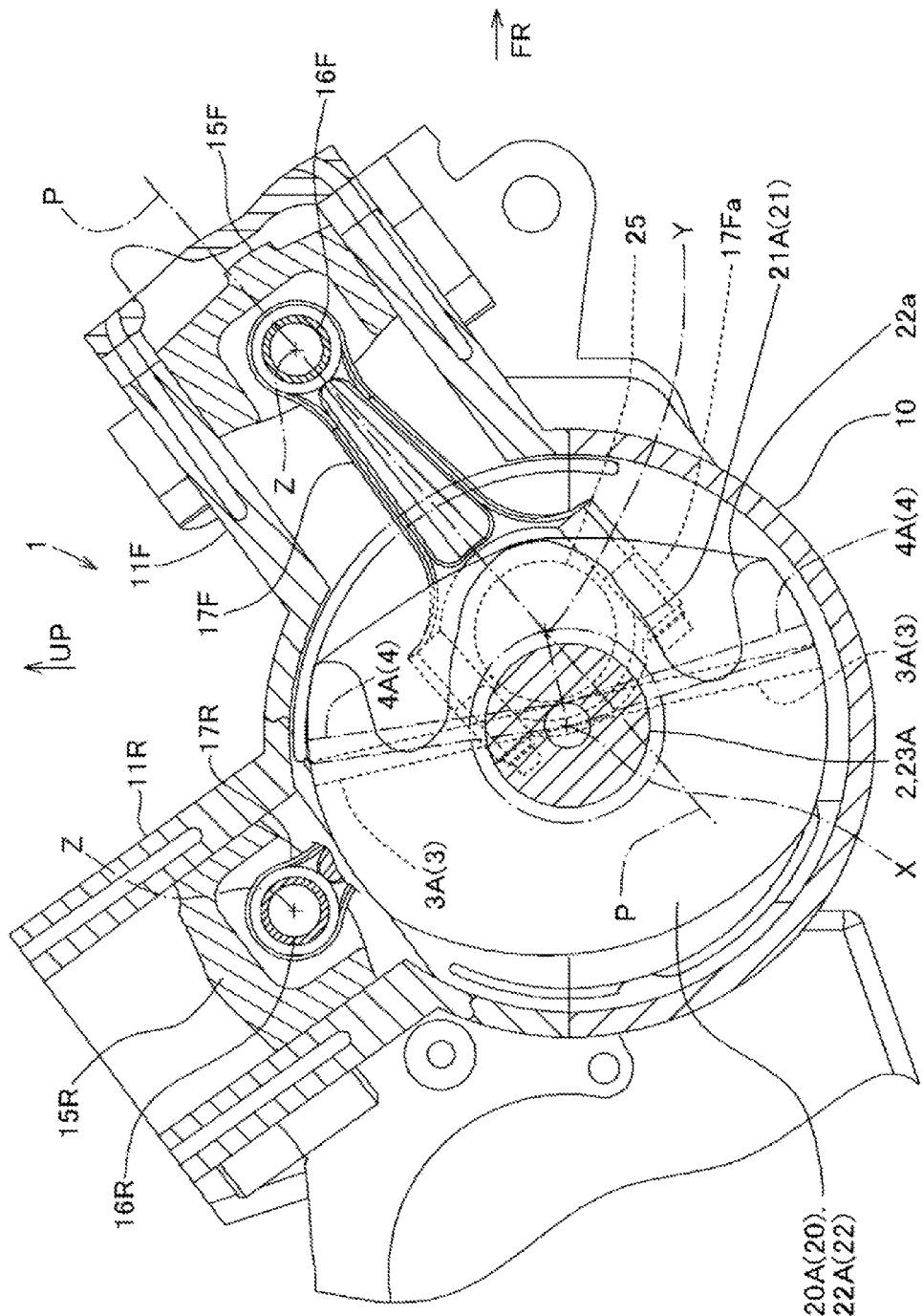
FIG. 2 is a right cross-sectional view of the internal combustion engine taken along arrow II-II in FIG. 1.

Referring to FIGS. 1 and 2, the crankshaft 2 is supported by being sandwiched between the mating faces of a crankcase 10 underneath and a cylinder block 11 on top in the internal combustion engine 1.

The cylinder block 11 has a front bank cylinder section 11F and a rear bank cylinder section 11R that extend longitudinally and diagonally upward from the area where the cylinder block 11 makes up a crank chamber together with the crank case 10. Front and rear cylinder heads 12F and 12R are stacked on top of the front and rear bank cylinder sections 11F and 11R, respectively. Further, front and rear head covers 13F and 13R cover the front and rear cylinder heads 12F and 12R.

The crankshaft 2 is a monolithic crankshaft that has crank webs 20 (the one on the axial end side will be referred to as a crank web 20A, and the one on the axial center side will be referred to as a crank web 20B if a distinction is made therebetween). In the crank webs 20, crank weight sections 22 (the one on the axial end side will be referred to as a crank weight section 22A, and the one on the axial center side will be referred to as a crank weight section 22B if a distinction is made therebetween) are formed to be continuous with crank arm sections 21 (the one on the axial end side will be referred to as a crank arm section 21A, and the one on the axial center side will be referred to as a crank arm section 21B if a distinction is made therebetween). Crank journals 23 (the one on the axial end side will be referred to as a crank journal 23A, and the one on the axial center side will be referred to as a crank journal 23B if a distinction is made therebetween) are formed along a central axis of rotation (axial line X of the crankshaft) to project from the crank webs 20. A crank pin 25 connects the crank arm sections 21A and 21B of the crank webs 20A and 20B that are opposed to each other. The crankshaft 2 is formed by horizontally arranging two sets, each set being made up of the crank pin 25 and the crank webs 20A and 20B, one crank web on each side of the crank pin, and connecting the two sets monolithically with the common crank journal 23B on the axial center side.

Figure 4:
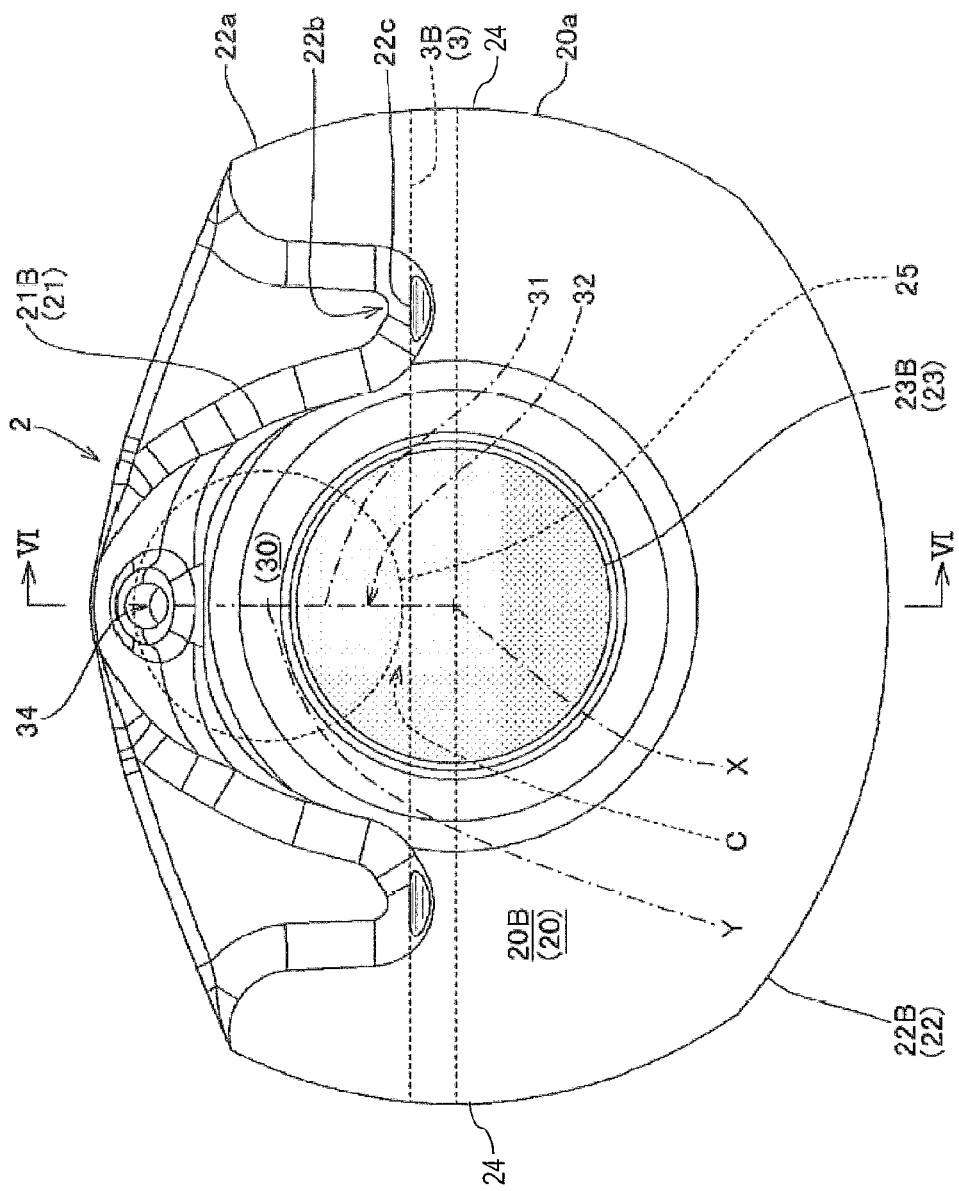
FIG. 4 is a cross-sectional view of the crankshaft in the width direction taken along arrow IV-IV in FIG. 3.

As illustrated in FIG. 4, the crank web 20 is formed so that the crank arm section 21 extends, as seen in the direction of the crankshaft, from the crank pin 25 toward the axial line X of the crankshaft 2 (i.e., axial line of the crank journals 23) in such a manner as to spread wider than the outer diameter of the crank pin 25, reaching the crank weight section 22. Bulging portions 22a are formed in the crank weight section 22. The bulging portions 22a extend in the shape of an arc on both lateral sides of the axial line X of the crankshaft 2 and extend more upward in FIG. 4 to the lateral sides of the crank pin 25 than the connection section between the crank pin 25 and the crank web 20. Each of the bulging portions 22a is in the approximate shape of a crescent plate or an anchor plate having a wide outer diameter.

Referring again to FIGS. 1 and 2, the three crank journals 23 of the monolithic crankshaft 2 configured as described above that are arranged horizontally are installed in a freely rotatable manner by being sandwiched between a bearing wall 11a of the cylinder block 11 and a bearing wall 10a of the crankcase 10 via a bearing 14.

In the case of this V-type four-cylinder internal combustion engine, the crank angle positions of the left and right crank pins 25 are the same.

That is, the left and right crank pins 25 overlap in axial view of the crankshaft.

Front and rear connecting rods 17F and 17R connect front and rear piston pins 16F and 16R of front and rear pistons 15F and 15R and the left and right crank pins 25, respectively, thus forming a crank mechanism. The front and rear pistons 15F and 15R slide in a reciprocating manner in the cylinder bores of the front and rear bank cylinder sections 11F and 11R.

A large end 17Fb of the front connecting rod 17F and a large end 17Rb of the rear connecting rod 17R are arranged horizontally side by side and fitted to each of the left and right crank pins 25 in a freely rotatable manner via metal bearings 18.

That is, both the front and rear connecting rods 17F and 17R are connected to the same crank pin 25.

It should be noted that each of the large ends 17Fb and 17Rb of the connecting rods 17F and 17R is dividable into two halves, one on the side of the rod main body and another on the side of the rod cap. The large ends 17Fb and 17Rb are fitted in such a manner as to sandwich the crank pin 25 via the metal bearing 18.

Figure 3:
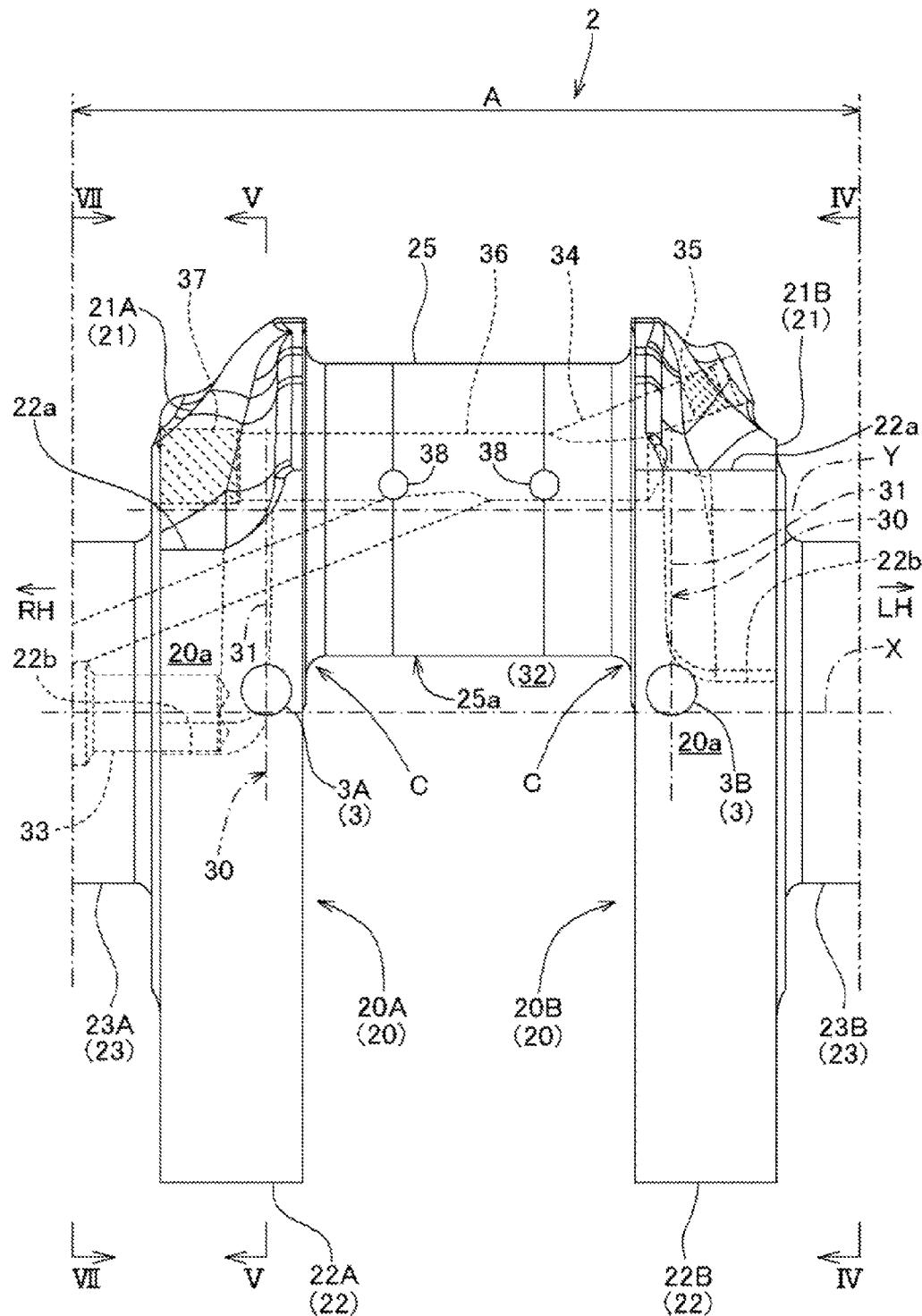
FIG. 3 is a partial vertical side view of the crankshaft illustrating section A taken out from the crankshaft in FIG. 1.

FIG. 3 is a partial vertical side view of the crankshaft 2 illustrating section A (dot-hatched area in FIG. 1) taken out from the crankshaft 2 in FIG. 1. As illustrated in FIG. 3, through holes 3 ("holes" in the present disclosure; may be holes with one end blocked) pass near connection sections C that are continuous from the crank pin 25 to the crank webs 20 on the opposed faces of the crank webs 20 facing each other. The through holes 3 are provided inside the crank webs 20 in such a manner as to be linear. The through holes 3 run along a first virtual plane 30 that is orthogonal to the axial line X of the crank journals 23 (which is aligned with the axial line X of the crank shaft 2) and are orthogonal to a virtual straight line 31. The virtual straight line 31 is orthogonal to and connects the axial line X of the crank journals 23 and an axial line Y of the crank pin 25 within the first virtual plane 30.

It should be noted that if a distinction is made between the through holes 3, the one provided in the crank web 20A on the axial end side will be referred to as a through hole 3A, and the one provided in the crank web 20B on the axial center side will be referred to as a through hole 3B.

The through holes 3 are located closer to the axial line X of the crank journals 23 than an outer perimeter face 25a of the crank pin 25 on the side of the axial line X of the crank journals 23 in a second virtual plane 32 (refer to FIG. 6) that passes through the axial line Y of the crank pin 25 and the axial line X of the crank journals 23.

The crankshaft 2 according to the present embodiment is formed by being forged and molded monolithically.

Each of the connection sections C that forms a continuous corner portion from the crank pin 25 to the crank web 20 to connect the crank pin 25 and the crank web 20 is an area where stress is concentrated due to the pressure exerted on the crank pin 25 during combustion of the internal combustion engine 1. In order to distribute and alleviate stress that occurs on the connection sections C, the through holes 3 as described above are provided near the connection sections C.

That is, the through holes 3 are provided inside the crank webs 20 in such a manner as to run along the first virtual plane 30 that is orthogonal to the axial line X of the crank journals 23 and pass near the connection sections C between the crank pin 25 and the crank webs 20. Because the through holes 3 are provided near the areas where stress, caused by the pressure exerted from the connecting rods 17F and 17R during combustion of the cylinders, is concentrated, stress is distributed around the through holes 3, thus contributing to reduced stress. Further, the through holes 3 rather than grooves as in prior arts are provided, thus ensuring rigidity of the crank webs 20.

Still further, as illustrated in FIG. 3, the through holes 3 are located closer to the axial line X of the crank journals 23 than the outer perimeter face 25a of the crank pin 25 on the side of the axial line X of the crank journals 23 in the second virtual plane 32 (refer to FIG. 6) that passes through the axial line Y of the crank pin 25 and the axial line X of the crank journals 23. This makes it possible to distribute stress caused by the pressure received from the connecting rods 17F and 17R during cylinder combustion by preventing stress from being concentrated on either the connection sections C between the crank pin 25 and the crank webs 20 or the surrounding areas of the through holes 3.

FIG. 4 is a cross-sectional view of the crankshaft 2 in the width direction taken along arrow IV-IV in FIG. 3. FIG. 4 illustrates the cross section of the crank journal 23B on the axial center side and the left side face of the crank web 20B on the axial center side. The crank pin 25 is shown behind the crank web 20B by a dashed line.

The crank web 20B is formed so that the crank arm section 21B on the axial center side extends, as seen in the direction of the crankshaft, from the crank pin 25 toward the axial line X of the crankshaft 2 in such a manner as to spread wider than the outer diameter of the crank pin 25, reaching the crank weight section 22B on the axial center side near the connection section C between the crank pin 25 and the crank web 20B on the axial center side.

The bulging portions 22a are formed in the crank weight section 22B. The bulging portions 22a extend in the shape of an arc on both lateral sides of the axial line X of the crankshaft 2 and extend more upward in FIG. 4 to the lateral sides of the crank pin 25 than the connection section C between the crank pin 25 and the crank web 20B. Each of the bulging portions 22a is in the approximate shape of a crescent plate or an anchor plate having a wide outer diameter.

Therefore, recessed portions 22b that are recessed downward in FIG. 4 are formed, each between the crank arm section 21B and one of the bulging portions 22a. The crank arm section 21B connects the crank pin 25 and the crank weight section 22B. Each of the recessed portions 22b has an opening portion 22c that is open to the outside where the recessed portion 22b overlaps the through hole 3B on the axial center side.

FIG. 4 is a cross-sectional view in the width direction that is orthogonal to the axial line X of the crank journals 23. FIG. 4 shows that the through hole 3B on the axial center side is provided inside the crank web 20B in such a manner as to be linear from side faces 24, which include a first side face and a second side face, of the crank web 20B in axial view of the crankshaft 2, i.e., along the first virtual plane 30 that is orthogonal to the axial line X of the crank journal 23B inside the crank web 20B. The through hole 3B is orthogonal to the virtual straight line 31 that is, in turn, orthogonal to and connects the axial line X of the crank journal 23B on the axial center side and the axial line Y of the crank pin 25 within the first virtual plane 30. FIG. 4 also shows that the through hole 3B is located closer to the axial line X of the crank journal 23B than the outer perimeter face 25a of the crank pin 25 on the side of the axial line X of the crank journal 23B.

Further, as illustrated in FIG. 4, the through hole 3B is provided in such a manner as to penetrate side portions 20a of the crank web 20B on the axial center side. The through hole 3B can be made from the lateral side of the axial line X of the crank journal 23B in such a manner as to penetrate the side portions 20a of the crank web 20B, thus ensuring ease of hole making.

Still further, the crank weight section 22B on the axial center side is formed monolithically on the opposite side of the crank pin 25 with the axial line X of the crank journal 23B sandwiched therebetween in the crank web 20B. The bulging portions 22a are formed in the crank weight section 22B. The bulging portions 22a extend in the shape of an arc on both lateral sides of the axial line X of the crankshaft 2 and extend more upward in FIG. 4 to the lateral sides of the crank pin 25 than the connection section C between the crank pin 25 and the crank web 20B. The through hole 3B penetrates the bulging portions 22a.

Therefore, even when the crank webs are shaped so that the bulging portions 22a are provided in the crank weight section 22B to adjust the moment of inertia of the crank weight section 22B, it is possible to form a stress distribution structure with ease by forming the through hole 3B that penetrates the bulging portions 22a.

Figure 5:
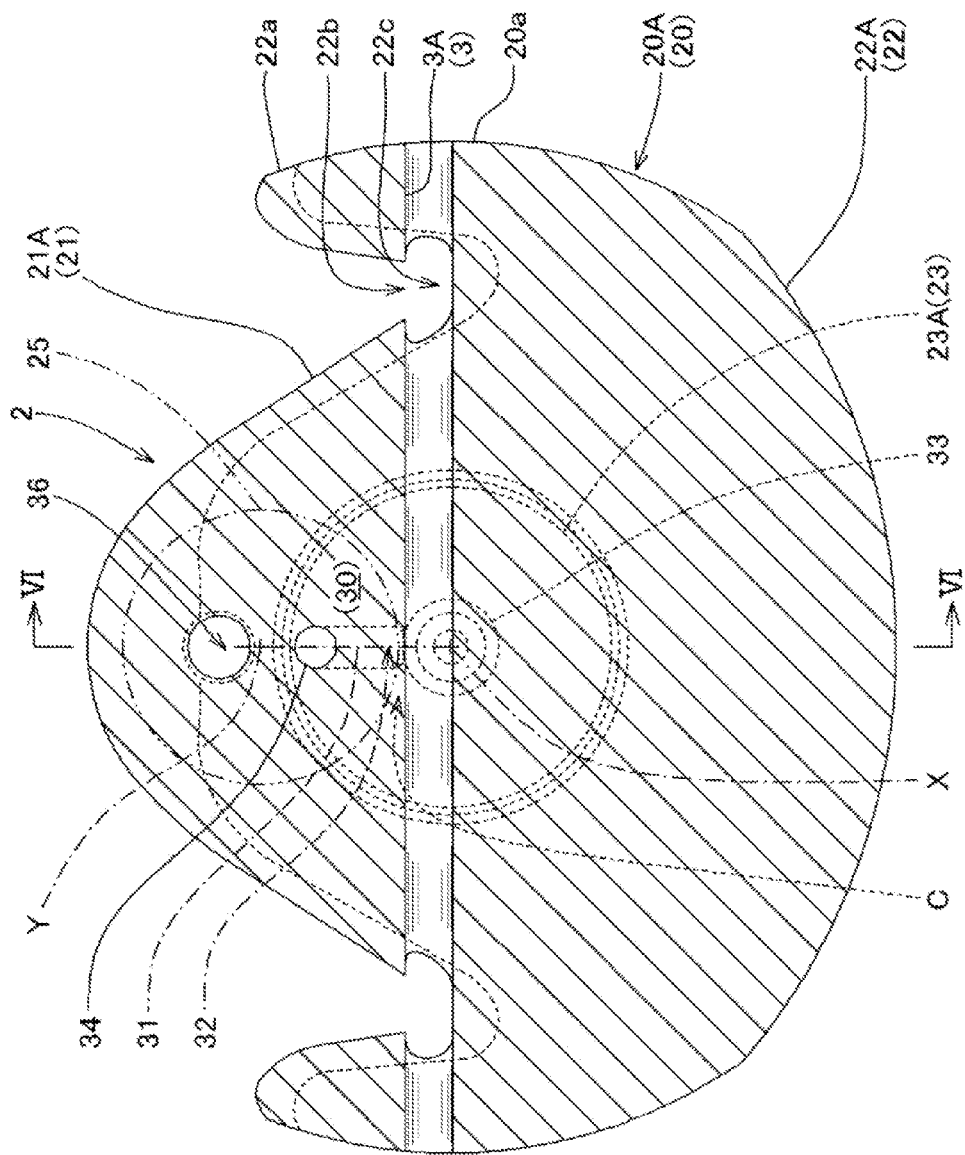
FIG. 5 is a cross-sectional view of the crankshaft in the width direction taken along arrow V-V in FIG. 3.

FIG. 5 is a cross-sectional view of the crankshaft 2 in the width direction taken along arrow V-V in FIG. 3. FIG. 5 illustrates the left cross section of the crank web 20A on the axial end side and the cross section of the through hole 3A on the axial end side. The crank journal 23A on the axial end side is shown behind the crank web 20A by a dashed line. The crank pin 25 is in front of the crank web 20A in FIG. 5 and, therefore, shown by a long dashed double-short dashed line.

The crank web 20A is formed so that the crank arm section 21A on the axial end side extends, as seen in the direction of the crankshaft, from the crank pin 25 toward the axial line X of the crankshaft 2 in such a manner as to spread wider than the outer diameter of the crank pin 25, reaching the crank weight section 22A on the axial end side near the connection section C between the crank pin 25 and the crank web 20A on the axial end side.

The bulging portions 22a are formed in the crank weight section 22A. The bulging portions 22a extend in the shape of an arc on both lateral sides of the axial line X of the crankshaft 2 and extend more upward in FIG. 5 to the lateral sides of the crank pin 25 than the connection section C between the crank pin 25 and the crank web 20A. Each of the bulging portions 22a is in the approximate shape of a crescent plate or an anchor plate having a wide outer diameter.

Therefore, the recessed portions 22b that are recessed downward in FIG. 5 are formed, each between the crank arm section 21A and one of the bulging portions 22a. The crank arm section 21A connects the crank pin 25 and the crank weight section 22A. Each of the recessed portions 22b has the opening portion 22c that is open to the outside where the recessed portion 22b overlaps the through hole 3A on the axial end side.

FIG. 5 is a cross-sectional view in the width direction that is orthogonal to the axial line X of the crank journal 23A. FIG. 5 shows that the through hole 3A on the axial end side is provided inside the crank web 20A in such a manner as to be linear from the side face of the crank web 20A in axial view of the crankshaft 2, i.e., along the first virtual plane 30 that is orthogonal to the axial line X of the crank journal 23A inside the crank web 20A. The through hole 3A is orthogonal to the virtual straight line 31 that is, in turn, orthogonal to and connects the axial line X of the crank journal 23A on the axial end side and the axial line Y of the crank pin 25 within the first virtual plane 30. FIG. 5 also shows that the through hole 3A is located closer to the axial line X of the crank journal 23A than the outer perimeter face 25a of the crank pin 25 on the side of the axial line X of the crank journal 23A.

Further, as illustrated in FIG. 5, the through hole 3A is provided in such a manner as to penetrate the side portions 20a of the crank web 20A on the axial end side. The through hole 3A can be made from the lateral side of the axial line X of the crankshaft 2 in such a manner as to penetrate the side portions 20a of the crank web 20A, thus ensuring ease of hole making.

Still further, the crank weight section 22A on the axial end side is formed monolithically on the opposite side of the crank pin 25 with the axial line X of the crank journal 23A sandwiched therebetween in the crank web 20A. The bulging portions 22a are formed in the crank weight section 22A. The bulging portions 22a extend in the shape of an arc on both lateral sides of the axial line X of the crankshaft 2 and extend more upward in FIG. 5 to the lateral sides of the crank pin 25 than the connection section C between the crank pin 25 and the crank web 20A. The through hole 3A penetrates the bulging portions 22a.

Therefore, even when the crank webs are shaped so that the bulging portions 22a are provided in the crank weight section 22A to adjust the moment of inertia of the crank weight section 22A, it is possible to form a stress distribution structure with ease by forming the through hole 3A that penetrates the bulging portions 22a.

It should be noted that, in the combustion stroke of the internal combustion engine 1, combustion begins as a result of ignition before the piston reaches the top dead center, and the expansion pressure is maximum when the piston passes more or less the top dead center, thus causing the maximum pressure to be exerted on the crank pin 25 via the connecting rods 17F and 17R.

FIG. 2 is a right side view of the internal combustion engine 1 showing a condition in which the expansion pressure is maximum in the combustion stroke of the right cylinder of the front bank cylinder section 11F and the maximum pressure is exerted on the crank pin 25 via the front connecting rod 17F.

Letting the straight line connecting a central axial line Z of the piston pin 16F and the central axis of the crank pin 25 (axial line Y of the crank pin 25) at the crank angle where the maximum pressure is exerted on the crank pin 25 be denoted as a maximum pressure straight line P, the maximum pressure straight line P intersects the through hole 3 in right side view (refer to FIG. 2).

Similarly, in the rear bank cylinder section 11R, the maximum pressure straight line P connecting the central axial line Z of the piston pin 16R and the central axis of the crank pin 25 (axial line Y of the crank pin 25) at the crank angle where the maximum pressure is exerted on the crank pin 25 intersects the through hole 3 in right side view.

Therefore, the through holes 3 are made near the connection sections C between the crank pin 25 and the crank webs 20, thus making it possible to distribute stress on the connection sections C to the extent possible. In addition, the presence of the through holes 3 on the maximum pressure straight line P effectively relieves the maximum concentration of stress taking place on the connection sections C at the crank angle where the maximum pressure is exerted on the crank pin 25, thus contributing to improved durability of the crankshaft 2.

In the present embodiment, the crankshaft 2 includes the crank webs 20, the crank journals 23, and the crank pins 25 that are monolithically molded. Each of the crank webs 20 includes the crank arm section 21 and the crank weight section 22. The crankshaft 2 has a structure that permits only vertical mold parting for monolithic molding. However, it is possible to obtain a stress distribution structure with ease by vertically parting the molds in the orientation shown in FIGS. 4 and 5.

Further, oiling passages are formed inside the monolithically molded crankshaft 2 to supply lubricating oil to the metal bearings 18 of coupling sections between the crank pins 25 and the large ends 17Fa of the connecting rods 17F and 17R (refer to FIG. 1).

Figure 6:
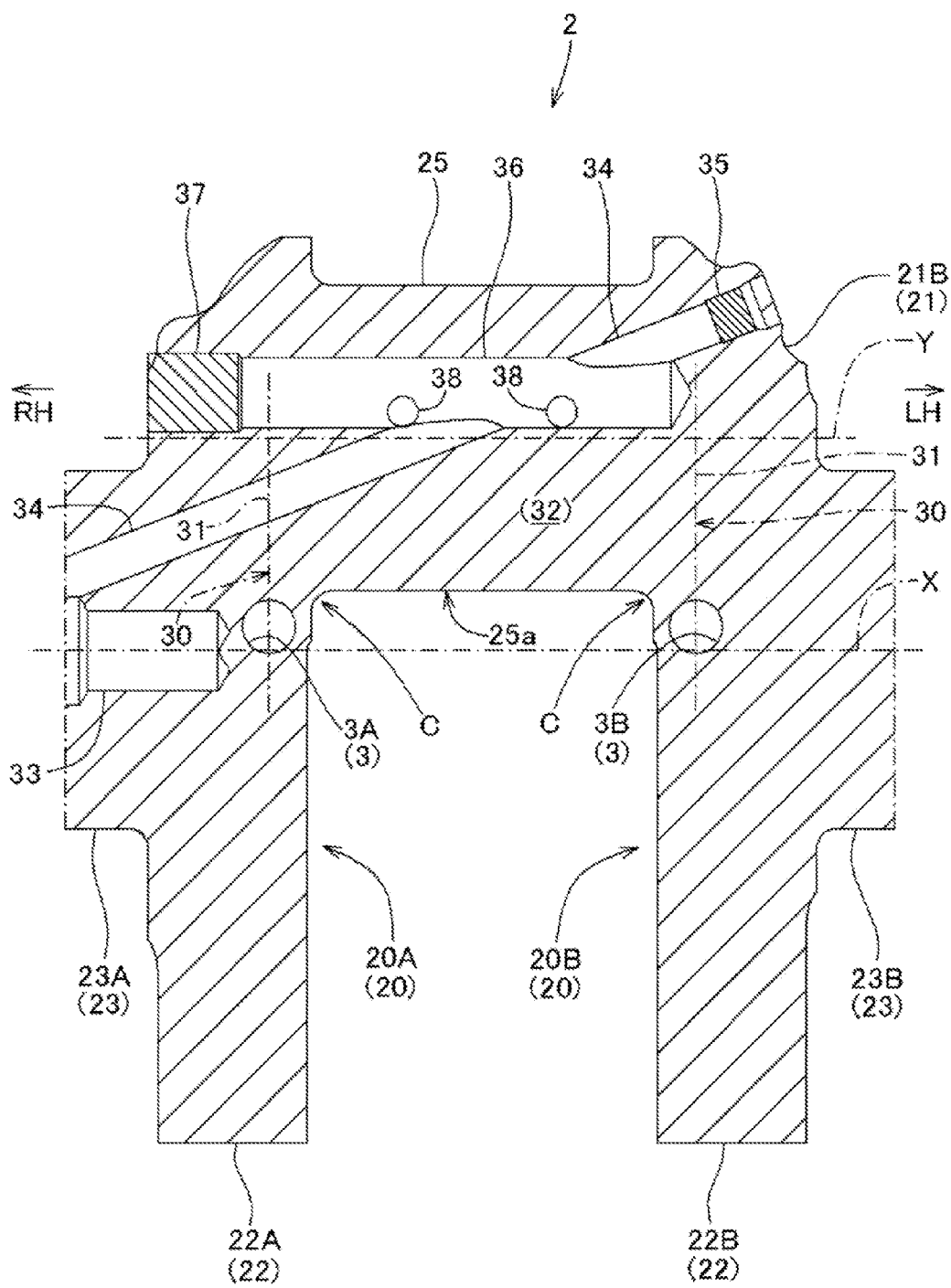
FIG. 6 is a partial vertical cross-sectional view of the crankshaft taken along arrow VI-VI in FIGS. 4 and 5.

As illustrated in FIG. 6 which is a partial vertical cross-sectional view of the crankshaft 2 taken along arrow VI-VI in FIGS. 4 and 5, a first oiling passage 33 is formed in the crank journal 23A on the axial end side from the axial end side to midway of the crank web 20A on the axial end side. The first oiling passage 33 runs along the axial line X and is used to take in lubricating oil. A second oiling passage 34 is made inside the crank pin 25 to extend diagonally and run from the first oiling passage 33 into the crank pin 25 through the crank arm section 21A on the axial end side. The tip portion of the second oiling passage 34 is blocked by a stopper member 35.

Then, a third oiling passage 36 is made in the crank pin 25 to run from the crank arm section 21A on the axial end side in parallel with the axial line Y of the crank pin 25 in such a manner as not to penetrate the crank arm section 21B on the axial center side ahead. The third oiling passage 36 is connected to the second oiling passage 34. The root of the third oiling passage 36 is blocked with a stopper member 37.

Fourth oiling passages 38 are made inside the crank pin 25 in such a manner as to be orthogonal to the third oiling passage 36. Both ends of each of the fourth oiling passages 38 are open as lubricating oil discharge ports on the outer perimeter faces of the crank pin 25 to supply lubricating oil to the inside of the metal bearings 18.

FIG. 7 relates to a modification example of the present embodiment. The crankshaft 2 of the modification example includes through holes 4 ("holes" in the present disclosure; may be holes with one end blocked) (the one provided on the crank web 20A on the axial end side will be referred to as a through hole 4A, and the one provided on the crank web 20B on the axial center side will be referred to as a through hole 4B if a distinction is made therebetween) rather than the through holes 3. Other components and structures are the same as those of the embodiment described above. The same sections are either not shown or not described and denoted by the same reference symbols. A description will be given primarily of the differences.

FIG. 7 is a cross-sectional view of the crankshaft 2 in the width direction taken along arrow VII-VII in FIG. 3, showing the cross section of the crank journal 23A on the axial end side and the right side face of the crank web 20A on the axial end side. The crank pin 25 is shown behind the crank web 20A by a dashed line.

The crank web 20A is formed so that the crank arm section 21A on the axial end side extends, as seen in the direction of the crankshaft, from the crank pin 25 toward the axial line X of the crankshaft 2 in such a manner as to spread wider than the outer diameter of the crank pin 25, reaching the crank weight section 22A on the axial end side near the connection section C between the crank pin 25 and the crank web 20A on the axial end side.

The bulging portions 22a are formed in the crank weight section 22A. The bulging portions 22a extend in the shape of an arc on both lateral sides of the axial line X of the crankshaft 2 and extend more upward in FIG. 7 to the lateral sides of the crank pin 25 than the connection section C between the crank pin 25 and the crank web 20A. Each of the bulging portions 22a is in the approximate shape of a crescent plate or an anchor plate having a wide outer diameter.

Therefore, the recessed portions 22b that are recessed downward in FIG. 7 are formed, each between the crank arm section 21A and one of the bulging portions 22a. The crank arm section 21A connects the crank pin 25 and the crank weight section 22A. Each of the recessed portions 22b has the opening portion 22c that is open to the outside where the recessed portion 22b overlaps the through hole 4A on the axial end side.

FIG. 7 is a cross-sectional view in the width direction that is orthogonal to the axial line X of the crank journal 23A on the axial end side. FIG. 7 shows that the through hole 4A on the axial end side is provided inside the crank web 20A in such a manner as to extend from the side face of the crank web 20A in axial view of the crankshaft 2, i.e., along the first virtual plane 30 that is orthogonal to the axial line X of the crank journal 23A inside the crank web 20A toward both lateral sides of the axial line X of the crank journal 23A on the axial end side within the first virtual plane 30. The through hole 4A extending to both lateral sides is angled and connected near the axial line X of the crank journal 23A in such a manner as to bend toward the crank pin 25.

The through hole 4A is provided in such a manner as to penetrate the side portions 20a of the crank web 20A on the axial end side. The through hole 4A can be made from the lateral side of the axial line X of the crankshaft 2 in such a manner as to penetrate the side portions 20a of the crank web 20A, thus ensuring ease of hole making.

Further, the through hole 4A is provided in such a manner as to penetrate the bulging portions 22a.

Therefore, even when the crank webs are shaped so that the bulging portions 22a are provided in the crank weight section 22A to adjust the moment of inertia of the crank weight section 22A, it is possible to form a stress distribution structure with ease by forming the through hole 4A that penetrates the bulging portions 22a.

The through hole (4B) not shown on the axial center side provided on the crank web 20B on the axial center side is angled and connected near the axial line X of the crank journal 23B on the axial center side in such a manner as to bend toward the crank pin 25 as with the through hole 4A on the axial end side.

As is clear from the through hole 4 according to the modification example shown by a long dashed double-short dashed line in FIG. 2, the through hole 4 intersects the maximum pressure straight line P at a larger angle than that the through hole 3 does, making it easier to distribute stress by the through hole 4.

Therefore, the through holes 4 (4A and 4B) according to the modification example are such that even if the stress concentration position changes due to the characteristic of the internal combustion engine 1, each of the holes 4 on both lateral sides is angled in such a direction as to surround the crank pin 25, thus forming a stress distribution structure with ease.

Further, in the modification example, the crankshaft 2 also includes the crank webs 20, the crank journals 23, and the crank pins 25 that are monolithically molded. Each of the crank webs 20 includes the crank arm section 21 and the crank weight section 22. The crankshaft 2 has a structure that permits only vertical mold parting for monolithic molding. However, it is possible to obtain a stress distribution structure with ease by vertically parting the molds in the orientation shown in FIG. 7.

A description has been given above of an embodiment of the present invention and a crankshaft of a modification example thereof. However, it is a matter of course that the mode of the present invention is not limited to the above embodiment and the modification example thereof and includes embodiments that are implemented in various ways within the scope of the present invention.

In the above embodiment, for example, a case was taken as an example in which the embodiment of the present invention was applied to the crankshaft used for a V-type four-cylinder internal combustion engine. However, the embodiment of the present invention is applicable not only to the crankshaft used for a V-type four-cylinder internal combustion engine but also to those used for single-cylinder, in-line multi-cylinder, and other engines.

In the above embodiment and the modification example thereof, the through holes 3 (3A and 3B) and 4 (4A and 4B) may be holes with one end blocked.

Further, a monolithically molded crankshaft was shown in the present embodiment. In first to fifth aspects of the embodiment of the present invention described below, however, a crankshaft having separate crank pins that are fitted to the crank webs for installation is also included in the embodiment of the present invention.

It should be noted that a description has been given of the horizontal arrangement of only the specific components illustrated in the drawings for convenience of description. However, components may be arranged horizontally in reverse from those shown in the above embodiment, and such components are also included in the embodiment of the present invention.

A first aspect of the embodiment of the present invention is a crankshaft of an internal combustion engine that includes crank journals, crank pins, and crank webs. The crank journals are pivotally supported by a crankcase. The crank pins pivotally support connecting rods. The crank webs connect the crank journals and the crank pin. Holes are provided in the crank webs. The holes run from the side faces of the crank webs in axial view of the crankshaft and pass near connection sections between the crank pin and the crank webs.

A second aspect of the embodiment of the present invention is the crankshaft of the first aspect of the embodiment of the present invention in which the holes are located closer to an axial line of the crank journals than an outer perimeter face of the crank pin on the side of the axial line of the crank journals.

A third aspect of the embodiment of the present invention is the crankshaft of the first or the second aspect of the embodiment of the present invention in which the holes penetrate side portions of the crank webs.

A fourth aspect of the embodiment of the present invention is the crankshaft of any one of the first to third aspects of the embodiment of the present invention in which each of the holes on both lateral sides of the axial line of the crank journal in side view is angled in such a manner as to bend toward the crank pin.

A fifth aspect of the embodiment of the present invention is the crankshaft of any one of the first to fourth aspects of the embodiment of the present invention in which a crank weight section is formed monolithically on the opposite side of the crank pin with the axial line of the crankshaft sandwiched therebetween in each of the crank webs. Bulging portions are formed in the crank weight section. The bulging portions extend in the shape of an arc on both lateral sides of the axial line of the crankshaft and extend to the lateral sides of the crank pin more than the connection sections between the crank pin and the crank webs. The holes penetrate the bulging portions.

A sixth aspect of the embodiment of the present invention is the crankshaft of any one of the first to fifth aspects of the embodiment of the present invention in which the crankshaft is molded monolithically.

In the crankshaft according to the first aspect of the embodiment of the present invention, holes are provided near the connection sections between the crank pin and the crank webs, areas where stress is concentrated due to the pressure received from the connecting rods during cylinder combustion, thus contributing to reduced stress thanks to distribution of stress around the holes. Further, holes rather than grooves as in prior arts are provided, thus ensuring rigidity of the crank webs.

In the second aspect of the embodiment of the present invention, it is possible, in addition to the advantageous effect offered by the first aspect of the embodiment of the present invention, to distribute stress caused by the pressure received from the connecting rods during cylinder combustion by preventing stress from being concentrated on either the connection sections between the crank pin and the crank webs or the surrounding areas of the holes.

In the third aspect of the embodiment of the present invention, it is possible, in addition to the advantageous effect offered by the first or the second aspect of the embodiment of the present invention, to make holes in such a manner as to penetrate the side portions of the crank webs from the lateral side of the axial line of the crankshaft, thus ensuring ease of hole making.

In the fourth aspect of the embodiment of the present invention, in addition to the advantageous effect offered by any one of the first to third aspects of the embodiment of the present invention, even if the stress concentration position changes due to the characteristic of the internal combustion engine, each of the holes on both lateral sides is angled in such a direction as to surround the crank pin, thus forming a stress distribution structure with ease.

In the fifth aspect of the embodiment of the present invention, it is possible, in addition to the advantageous effect offered by any one of the first to fourth aspects of the embodiment of the present invention, to form a stress distribution structure with ease by forming holes that penetrate the bulging portions even when the crank webs are shaped so that the bulging portions are provided in the crank weight section to adjust the moment of inertia of the crank weight section.

In the sixth aspect of the embodiment of the present invention, it is possible, in addition to the advantageous effect offered by any one of the first to fifth aspects of the embodiment of the present invention, to form a stress distribution structure with ease even for a structure that permits only vertical parting molding for monolithic molding.

Obviously, numerous modifications and variations of the present invention are possible in light of the above teachings. It is therefore to be understood that within the scope of the appended claims, the invention may be practiced otherwise than as specifically described herein.

What is claimed is:

1. A crankshaft of an internal combustion engine, the crankshaft comprising:
    crank journals pivotally supported by a crankcase and configured to rotate about a crankshaft axis;
    crank pins adapted to pivotally support connecting rods; and
    crank webs that connect the crank journals and the crank pins, each crank web disposed between one of the cranks journals and one of the crank pins,
    wherein holes are provided in the crank webs, each hole being disposed between one of the crank journals and one of the crank pins, and
    the holes run from respective side faces of the crank webs, the side faces of each crank web being opposed to each other in a direction orthogonal to the crankshaft axis as viewed from the crankshaft axis, such that the holes pass adjacent to connection sections between the crank pins and the crank webs.

2. The crankshaft according to claim 1, wherein the holes are located closer to an axial line of the crank journals than an outer perimeter face of the crank pin on the side of the axial line of the crank journals.

3. The crankshaft according to claim 1, wherein the holes penetrate side portions of the crank webs that include the side faces of the crank webs.

4. The crankshaft according to claim 1, wherein each of the holes on both lateral sides of the axial line of the crank journal in side view is angled in such a manner as to bend toward the crank pin.

5. The crankshaft according to claim 1, wherein the crankshaft is molded monolithically.

6. The crankshaft according to claim 1,
    wherein each of the holes runs entirely within a respective plane that is orthogonal to the crankshaft axis.

7. The crankshaft according to claim 1,
    wherein the side faces of each of the crank webs includes a first side face and a second side face, the first side face and the second side face being separated from each other in the direction orthogonal to the crankshaft axis, and
    an opening of a first one of the holes is disposed on the first side face.

8. The crankshaft according to claim 7,
    wherein another opening of the first one of the holes is disposed on the second side face.

9. The crankshaft according to claim 1,
    wherein each of the connection sections extends continuously from one of the crank pins to one of the crank webs, the connection sections facing each other in an axial direction parallel to the crankshaft axis, and
    wherein the holes are adjacent to a respective one of the connection sections.

10. The crankshaft according to claim 1, wherein each hole is spaced from an axial center of the crank web in which the hole is disposed, as measured in an axial direction along the crankshaft axis.

11. The crankshaft according to claim 10, wherein a first one of the holes is disposed closer to a first crank pin of the crank pins as compared to a first crank journal of the crank journals, the first one of the holes being disposed between the first crank pin and the first crank journal.

12. A crankshaft of an internal combustion engine, comprising:
    a crank journal configured to be supported by a crankcase and configured to rotate around a crankshaft axis;
    a crank pin having a crank pin axis parallel to the crankshaft axis, the crank pin configured to support a connecting rod which is rotatable around the crank pin axis; and
    a crank web provided between the crank journal and the crank pin to connect the crank journal and the crank pin, the crank web having a hole disposed between the crank journal and the crank pin, the hole extending from one side face of the crank web in a direction orthogonal to the crankshaft axis and passing in a region that is adjacent to a connection section between the crank pin and the crank web as viewed in an axial direction along the crankshaft axis,
    wherein the hole is spaced from an axial center of the crank web in which the hole is disposed, as measured in the axial direction.

13. The crankshaft according to claim 12,
    wherein the hole is located closer to an axial line of the crank journal than an outer perimeter face of the crank pin on a side of the axial line of the crank journal.

14. The crankshaft according to claim 12,
    wherein the hole penetrates a side portion of the crank web that includes the side face of the crank web.

15. The crankshaft according to claim 12,
    wherein the hole on both lateral sides of an axial line of the crank journal in side view is angled in such a manner as to bend toward the crank pin.

16. The crankshaft according to claim 12,
    wherein the crankshaft is molded monolithically.

17. The crankshaft according to claim 12,
    wherein the hole extends linearly in the crank web.

18. The crankshaft according to claim 12,
    wherein the hole has an end which is blocked in the crank web.

19. The crankshaft according to claim 12,
    wherein the hole runs entirely within a plane that is orthogonal to the axial direction.

20. The crankshaft according to claim 12,
wherein the side faces the crank web includes a first side face and a second side face, the first side face and the second side face being separated from each other in a direction orthogonal to the crankshaft axis, and
wherein an opening of the hole is disposed on the first side face.

21. The crankshaft according to claim 20,
wherein another opening of the hole is disposed on the second side face.

22. The crankshaft according to claim 12,
wherein the connection section extends continuously from the crank pin to the crank web, the connection section facing an axial direction parallel to the crankshaft axis, and
wherein the hole is adjacent to the connection section.

23. The crankshaft according to claim 12, wherein the hole is disposed closer to the crank pin as compared to the crank journal.

24. A crankshaft of an internal combustion engine, the crankshaft comprising:
crank journals pivotally supported by a crankcase;
crank pins adapted to pivotally support connecting rods; and
crank webs adapted to connect the crank journals and the crank pin, wherein holes are provided in the crank webs,
the holes run from respective side faces of the crank webs as viewed from an axial direction of the crankshaft, and pass adjacent to connection sections between the crank pin and the crank webs,
a crank weight section is formed monolithically on the opposite side of the crank pin with the axial line of the crankshaft sandwiched therebetween in each of the crank webs,
bulging portions are formed in the crank weight section in such a manner as to extend in the shape of an arc on both lateral sides of the axial line of the crankshaft and extend to the lateral sides of the crank pin more than the connection sections between the crank pin and the crank webs, and
the holes penetrate the bulging portions.

25. A crankshaft of an internal combustion engine, comprising:
a crank journal configured to be supported by a crankcase and configured to rotate around a crankshaft axis;
a crank pin having a crank pin axis parallel to the crankshaft axis, the crank pin configured to support a connecting rod which is rotatable around the crank pin axis; and
a crank web provided between the crank journal and the crank pin to connect the crank journal and the crank pin, the crank web having a hole which extends from one side face of the crank web and passes in a region that is adjacent to a connection section between the crank pin and the crank web as viewed in an axial direction along the crankshaft axis,
wherein a crank weight section is provided monolithically on an opposite side of the crank pin with respect to an axial line of the crankshaft sandwiched between the crank pin and the crank weight section in the crank web,
wherein a bulging portion is provided in the crank weight section in such a manner as to extend in a shape of an arc on both lateral sides of the axial line of the crankshaft and extend to lateral sides of the crank pin more than the connection section between the crank pin and the crank web, and
wherein the hole penetrates the bulging portion.

* * * * *